US012115125B2

(12) United States Patent
Ta et al.

(10) Patent No.: US 12,115,125 B2
(45) Date of Patent: *Oct. 15, 2024

(54) FLEXIBLE LINER WITH INNER AND OUTER LAYERS FOR USE WITH A LIQUID-RECEIVING BASIN

(71) Applicant: Contego Spa Designs, Inc., Garden Grove, CA (US)

(72) Inventors: Jeff Ta, Garden Grove, CA (US); Lan Van Ta, Garden Grove, CA (US)

(73) Assignee: Contego Spa Designs, Inc., Garden Grove, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,562

(22) Filed: Jul. 31, 2023

(65) Prior Publication Data

US 2023/0372195 A1 Nov. 23, 2023

Related U.S. Application Data

(63) Continuation of application No. 17/360,117, filed on Jun. 28, 2021, now Pat. No. 11,730,670, which is a continuation of application No. 17/153,642, filed on Jan. 20, 2021, now Pat. No. 11,083,668, which is a continuation of application No. 17/020,258, filed on Sep. 14, 2020, now Pat. No. 11,331,247, which is a continuation of application No. 16/227,711, filed on Dec. 20, 2018, now Pat. No. 10,792,218, which is a continuation of application No. 14/962,930, filed on Dec. 8, 2015, now Pat. No. 10,195,108.

(51) Int. Cl.

| | |
|---|---|
| *A61H 35/00* | (2006.01) |
| *A61H 33/00* | (2006.01) |
| *A61H 33/02* | (2006.01) |

(52) U.S. Cl.

CPC ........... *A61H 35/006* (2013.01); *A61H 33/02* (2013.01); *A61H 33/0095* (2013.01); *A61H 2201/0149* (2013.01); *A61H 2201/0207* (2013.01); *A61H 2205/12* (2013.01)

(58) Field of Classification Search

CPC .. A61H 33/02; A61H 33/0087; A61H 35/006; A61H 2205/12

See application file for complete search history.

(56) References Cited

U.S. PATENT DOCUMENTS 430,195 A * 6/1890 Reimers ................. A47K 3/001 4/655

2,663,178 A 12/1953 Schwartz (Continued)

*Primary Examiner* — Erin Deery

(74) *Attorney, Agent, or Firm* — VISTA IP LAW GROUP LLP

(57) ABSTRACT

A liner for use with a basin to contain a liquid features a plurality of bodies of flexible plastic. Portions of an inner face of a first body of flexible plastic are joined to corresponding portions of an inner face of a second body of flexible plastic, through which a plurality of openings are formed, to provide a multi-layer body of flexible plastic. Other portions of the inner face of the first body of flexible plastic are not joined to corresponding other portions of the inner face of the second body of flexible plastic, defining an air conduit between the first body of flexible plastic and the second body of flexible plastic for guiding pressurized air substantially from an air discharge apparatus.

20 Claims, 9 Drawing Sheets

(56) References Cited

U.S. PATENT DOCUMENTS

| | | | | |
|---|---|---|---|---|
| 3,648,690 | A * | 3/1972 | Miller | A61H 33/025 4/583 |
| 3,814,399 | A * | 6/1974 | Melreit | B01F 23/23105 261/124 |
| 4,151,618 | A | 5/1979 | Carpenter | |
| 5,886,323 | A | 3/1999 | Hivale | |
| 6,772,800 | B1 | 8/2004 | Garcia | |
| 7,895,685 | B2 | 3/2011 | Vinokur et al. | |
| 8,387,175 | B2 | 3/2013 | Vinokur et al. | |
| 8,763,174 | B2 * | 7/2014 | Vinokur | C23C 16/4401 4/655 |
| 10,357,427 | B1 * | 7/2019 | Le | A61H 33/6042 |
| 2004/0199994 | A1 | 10/2004 | Sherif et al. | |
| 2009/0094735 | A1 | 4/2009 | Tran | |
| 2009/0106889 | A1 | 4/2009 | Brown | |
| 2009/0276951 | A1 | 11/2009 | Tran | |

* cited by examiner

FLEXIBLE LINER WITH INNER AND OUTER LAYERS FOR USE WITH A LIQUID-RECEIVING BASIN

RELATED APPLICATIONS

This application is a Continuation application of U.S. patent application Ser. No. 17/360,117 filed Jun. 28, 2021, which is a Continuation application of U.S. patent application Ser. No. 17/153,642 filed Jan. 20, 2021 now issued as U.S. Pat. No. 11,083,668, which is a Continuation application of U.S. patent application Ser. No. 17/020,258 filed Sep. 14, 2020 now issued as U.S. Pat. No. 11,331,247, which is a continuation of U.S. patent application Ser. No. 16/227,711 filed Dec. 20, 2018 now issued as U.S. Pat. No. 10,792,218, which is a continuation of U.S. patent application Ser. No. 14/962,930 filed Dec. 8, 2015 now issued as U.S. Pat. No. 10,195,108.

FIELD OF THE INVENTION

The present invention relates generally to liners for foot spas, and more particularly to liners having air passageways for providing a fluid massage feature of the foot spa.

BACKGROUND

Foot spas are relatively commonplace in the spa industry for providing pedicures. When used in a salon setting where a plurality of customers one after another will share a single foot spa unit over the course of a business day, disposable one-time-use liners are employed for insertion into the respective foot spa so as to contain a soaking solution used for a respective client. That is, the respective liner is intended to isolate the soaking solution from the soaking basin, so that bacteria may not be transferred from one user to the next. Therefore, only the liner may have to be replaced in order to prepare the foot spa for a subsequent user, without necessarily having to clean the soaking basin to remove residue of the soaking solution and thus without concern about transfer of contaminants from one user to the next.

Therefore, use of disposable liners may enhance hygienic practices in the spa industry by reducing need for sanitizing the soaking basin. Furthermore, use of disposable liners may enhance practices for prevention of infection such as by providing a relatively inexpensive arrangement which is disposable, so that those elements of the pedicure treatment which are contaminated by the feet of the respective patient can be discarded thereby removing possibility of contaminating the next patient.

As known to those with ordinary skill in the art, not only are these foot spas suited for providing therapeutic soaking of the user's feet, many such spas are arranged to provide a soothing massage of the feet while the user relaxes his/her feet in a soaking basin of the foot spa during the therapeutic soak. The massage may be provided by vibratory elements which engage soles of the feet through the liner. In other cases, air may be forced through the liner so as to provide streams of bubbles for performing the massage through the fluid.

In some instances, it is more desirable to provide the bubbles for performing the massage of the feet than by means of the vibratory elements. However, it remains preferable especially in a commercial salon setting to balance performance of the foot spa, such as that characterized by its massage feature, with hygienic practices.

Additionally, the bubbles may be used for mixing the soaking solution, which may contain medicinal ingredients or into which medicinal substances may be added. As such, the bubbles conveniently provide agitation of the soaking solution so that the soaking solution may be circulated about the user's feet within the soaking basin of the spa. Thus, in the case that the soaking solution contains medicinal components, the agitation and circulation of the soaking solution may afford enhanced diffusion of the medicinal components in the solution and may allow the medicinal components to reach necessary areas of the user's feet.

It is therefore desirable to provide a unique solution for a liner and foot spa which provide massage and mixing features by means of bubbles and provide proper isolation of the soaking solution, from the soaking basin, and from the previous user.

SUMMARY OF THE INVENTION

According to one aspect of the invention there is provided a liner for containing a soaking solution in use with a foot spa, the foot spa having (i) a soaking basin including a bottom base and an upstanding peripheral basin wall extending upwardly from the bottom base, and (ii) an air discharge apparatus arranged for supplying pressurized air at a supply location which is at or adjacent an inside face of the soaking basin, the liner comprising:

- a first body of plastic forming an outer layer of the liner that has an inner face and an outer face for resting against the inside face of the soaking basin;
- a second body of plastic joined to the inner face of the first body of plastic so as to form an inner layer of the liner;
- the joined first and second bodies of plastic being shaped to form a receptacle having a base floor and an upstanding peripheral liner wall extending therefrom such that (i) the receptacle delimits an inside volume that is lined by the second body of plastic for holding the soaking solution, and (ii) the receptacle is arranged for nesting in the soaking basin in a working configuration;
- an air conduit formed between the first and second bodies of plastic;
- the air conduit extending from a starting end thereof, which is locatable at the supply location of the foot spa in the working configuration of the liner, to the base floor of the receptacle formed by the first and second bodies of plastic for guiding the pressurized air supplied from the air discharge apparatus to the base floor;
- a coupling arrangement at the starting end of the air conduit for connecting to the air discharge apparatus;
- a plurality of openings located in the second body of plastic and formed across a full thickness thereof for passing the pressurized air from the air conduit into the inside volume of the receptacle;
- wherein the first body of plastic is imperforate from a location thereon at which the starting end of the air conduit is disposed to a free end of the first body of plastic defining a top of the peripheral liner wall so as to isolate the inside volume of the receptacle, where the soaking solution is containable, from the soaking basin in the working configuration of the liner.

In the embodiment as described in more detail hereinafter, the substantially imperforate first body of plastic provides an isolative lining between the soaking basin and the soaking solution while the perforated second body of plastic which lines the inside volume locates the openings for transferring the air into the soaking solution. The air conduit formed between the two layers of plastic may be capable of sustaining pressure of the air passed therethrough during operation of the soaking basin, without the soaking solution backing up through the air conduit in a reverse direction with respect to conventional flow of the pressurized air through the air conduit.

In one instance, the air conduit comprises a diameter which is sized in a range between 1 and 25 millimetres.

In another instance, the air conduit comprises a diameter which is sized in a range between 1.5 and 23 millimetres.

In yet another instance, the air conduit comprises a diameter which is sized in a range between 2 and 20 millimetres.

In one arrangement, each one of the first and second bodies of plastic is flexible such that walls of the air conduit are flexible and a diameter of the air conduit is expandable in response to a pressure value of the pressurized air passed through the air conduit.

In one arrangement, the air conduit forms a chamber at its terminal end at the base floor with a wall-to-wall width arranged to span across a majority of the area of the base floor.

In another arrangement, the air conduit forms a closed loop which is located at the base floor of the receptacle.

The air conduit may comprise a plurality of supply branches converging with the closed loop, each of the supply branches having a respective one of the coupling arrangement.

Preferably, the supply branches converge with the closed loop at spaced locations separately of one another.

In one instance, there are provided two supply branches converging with the closed loop at a common side of the closed loop such that the closed loop comprises an intermediate portion between junctions with the respective supply branch and a ring portion which is longer in length than the intermediate portion.

In one arrangement, the coupling arrangement comprises a sealing gasket embedded in the first body of plastic so as to be carried at the inner face thereof.

In another arrangement, the coupling arrangement comprises a flexible tube coupled to at least one of the first and second bodies of plastic and extending from the starting end of the air conduit so as to provide an extension of the air conduit to the supply location of the air discharge apparatus.

According to one aspect of the invention there is provided a pedicure apparatus for treating feet of a user comprising:

- a foot spa including:
  - a soaking basin for receiving the feet of the user, the soaking basin including a bottom base and an upstanding peripheral basin wall extending upwardly from the bottom base;
  - an air discharge apparatus arranged for supplying pressurized air at a supply location which is at or adjacent an inside face of the soaking basin;
- a liner installed in the soaking basin in a working configuration so as to cover the inside face of the soaking basin, the liner comprising:
  - a first body of plastic forming an outer layer of the liner that has an inner face and an outer face for resting at or adjacent the inside face of the soaking basin;
  - a second body of plastic joined to the inner face of the first body of plastic so as to form an inner layer of the liner that is segregated from the inside face of the soaking basin by the first body of plastic;
  - the joined first and second bodies of plastic being shaped to form a receptacle having a base floor which covers the inside face of the soaking basin at the bottom base thereof and an upstanding peripheral liner wall which covers the inside face of the soaking basin at the peripheral basin wall, with the receptacle delimiting an inside volume that is lined by the second body of plastic for holding a soaking solution into which the user's feet are inserted;
  - an air conduit formed between the first and second bodies of plastic;
  - the air conduit extending from a starting end thereof, which is located at the supply location of the foot spa in the working configuration of the liner, to the base floor of the receptacle formed by the first and second bodies of plastic for guiding the pressurized air supplied from the air discharge apparatus of the foot spa to the base floor of the liner;
  - a coupling arrangement at the starting end of the air conduit for connecting to the air discharge apparatus;
  - a plurality of openings located in the second body of plastic and formed across a full thickness thereof for passing the pressurized air from the air conduit into the inside volume of the receptacle;
  - wherein the first body of plastic is imperforate from a location thereon at which the starting end of the air conduit is disposed to a free end of the first body of plastic defining a top of the peripheral liner wall which is located at a top of the peripheral basin wall so as to isolate the inside volume of the receptacle, where the soaking solution is contained, from the soaking basin in the working configuration of the liner.

According to one aspect of the invention there is provided a method of forming a liner with an air conduit that is used with a foot spa for containing a soaking solution as part of a pedicure treatment of a user's feet, the foot spa having a soaking basin for receiving feet of the user and an air discharge apparatus arranged for supplying pressurized air at a supply location which is at or adjacent an inside face of the soaking basin, the method comprising:

- providing a first body of plastic having:
  - a surface area spanning across two opposite faces and a thickness measured therebetween;
  - a central body portion and a fringing body portion surrounding the central body portion with the first body of plastic being imperforate in all directions across its surface area from a predetermined starting location on the fringing body portion of the first body of plastic;
- providing a second body of plastic which is sized substantially equal to the first body of plastic or smaller in size than the first body of plastic;
  - the second body of plastic having a surface area spanning across two opposite faces and a thickness measured therebetween;
  - the second body of plastic registering with at least the central body portion of the first body of plastic with the second body of plastic locating a plurality of openings formed across its full thickness;
- welding the first and second bodies of plastic to one another at a first one of their respective faces with use of heat according to a prescribed heating pattern which applies heat to pre-specified areas of each body of plastic where the bodies of plastic are joined together at their first faces, with untreated areas of the surface of the first face of each body of plastic (i) registering with the predetermined starting location on the first body of plastic and the plurality of openings in the second body of plastic, and (ii) being free to separate from direct engagement with one another so that these untreated areas form the air conduit for guiding the pressurized air supplied from the air discharge apparatus of the foot spa;

arranging the first and second bodies of plastic so as to be formable into a receptacle having a base floor and an upstanding peripheral liner wall extending therefrom such that (i) the receptacle delimits an inside volume that is lined by the second body of plastic for holding the soaking solution, and (ii) the receptacle is arranged for nesting in the soaking basin in a working configuration, with the central body portion of the first body of plastic forming the base floor and the fringing body portion thereof forming the peripheral liner wall.

That is, it is preferred that the untreated areas form a path which is disposed between the first faces of the first and second bodies of plastic and which spans from the predetermined starting location on the fringing body portion of the first body of plastic to the plurality of openings of the second body of plastic.

In one arrangement, the untreated areas form a closed loop at the base floor which is formed by the central body portions of the first and second bodies of plastic.

In one arrangement, the first body of plastic comprises an opening formed across its full thickness at the predetermined starting location such that the first body of plastic is imperforate across its surface area with exception of said opening and the method includes a step of embedding a sealing gasket in the first body of plastic at the opening therein such that the sealing gasket is carried at the first face thereof for providing an air-tight seal during communication of the air discharge apparatus with the air conduit.

Alternatively, in another arrangement the method includes a step of welding a flexible tube in abutting engagement with a free end of at least one of the first and second bodies of plastic and in a position where the tube is adjacent the predetermined starting location and in alignment with the air conduit, whereby the flexible tube extends from a starting end of the air conduit located at the free end of said at least one of the first and second bodies of plastic and thus provides an extension of the air conduit to the supply location of the air discharge apparatus.

In the instance that the second body of plastic is sized substantially equal to the first body of plastic, the second body of plastic includes:

a central body portion and a fringing body portion surrounding the central portion;

the central body portion and the fringing body portion registering with the central and fringing portions of the first body of plastic with the central portion of the second body of plastic locating the plurality of openings;

wherein the central body portion of the second body of plastic forms the base floor of the receptacle with the central body portion of the first body of plastic and the fringing body portion of the second body of plastic forms the peripheral liner wall of the receptacle with the fringing body portion of the first body of plastic.

In one arrangement, the second body of plastic has an outer periphery which generally follows a path of the air conduit, where the air conduit traverses an area smaller than the surface area of the first body of plastic, so that a remaining surface area of the first face of the first body of plastic uncovered by the second body of plastic is exposable to the soaking solution.

The liner formed by this method may be easier and less expensive to manufacture than prior art liners for foot spas.

BRIEF DESCRIPTION OF THE DRAWINGS

Preferred arrangements of the invention will now be described in conjunction with the accompanying drawings in which.

In the drawings like characters of reference indicate corresponding parts in the different figures.

DETAILED DESCRIPTION

Figure 1A:
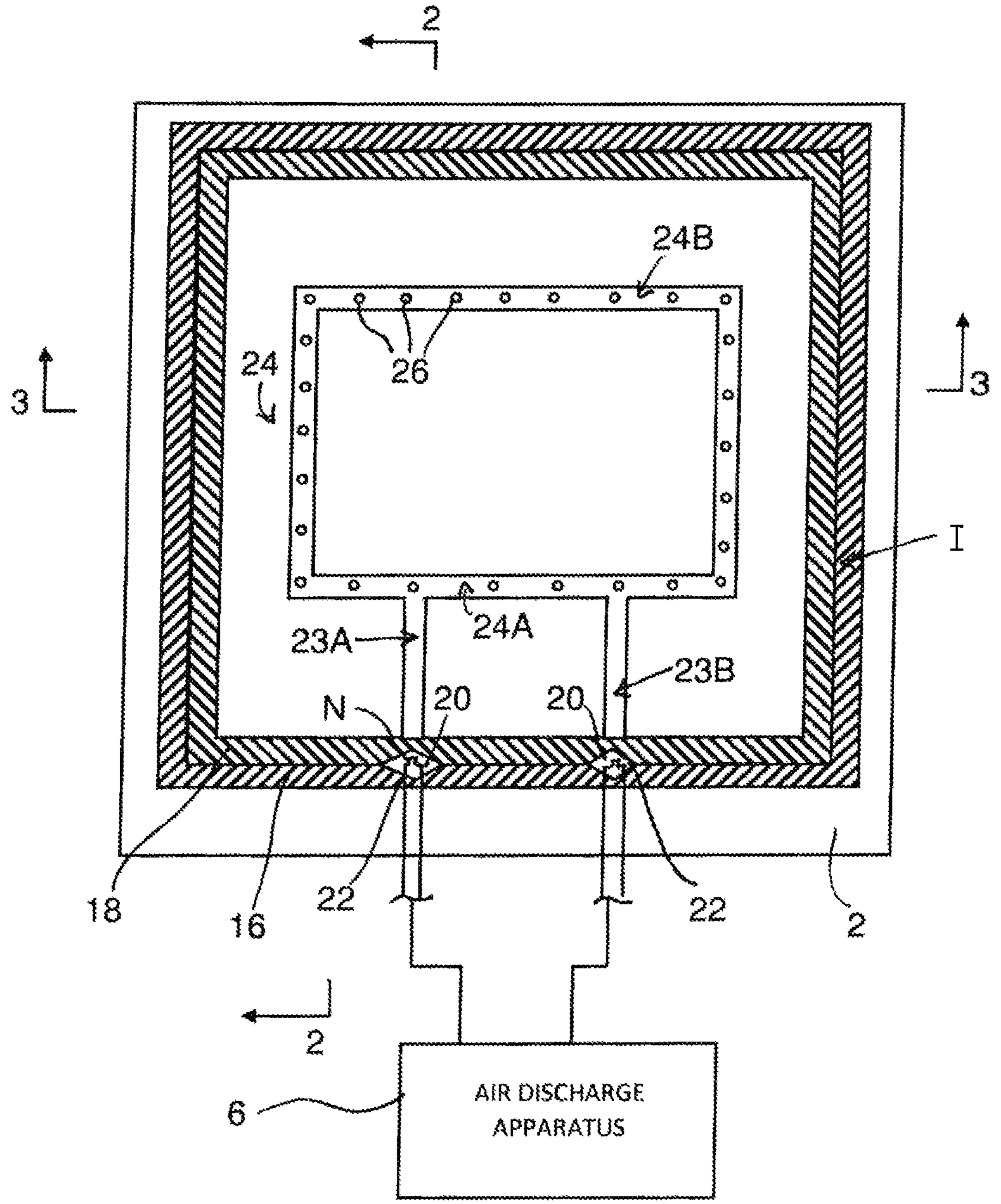
FIG. 1A is a top plan view of foot spa and liner according to the present invention showing a first arrangement thereof with a top portion of the liner removed to show an air conduit therein.

Referring to the accompanying figures, there is illustrated a liner that is generally indicated by reference numeral 10, which is suited for use with a foot spa 1. As will be described in more detail hereinafter, the liner is arranged for nesting in a soaking basin 2 of the foot spa in a working configuration of the liner so as to fit in the soaking basin and cover an inside face of the soaking basin, with the soaking basin providing structural support for the liner. Thus, the liner 10, which is disposable so as to be suited for one-time use, provides a generally basin-shaped receptacle with a base floor 12 and raised peripheral receptacle wall 14 extending from the base floor for containing a soaking solution in isolation of the soaking basin 2 of the foot spa 1.

The soaking basin 2, which is suited for receiving feet of a user, comprises a bottom base 3 and an upstanding peripheral basin wall 4 extending upwardly from the bottom base. In the illustrated embodiment, the bottom base and the basin wall are unitary so as to form a single solid body.

An air discharge apparatus 6 (schematically shown) is provided with the foot spa 1 for generating pressurized air. This air discharge apparatus (including an air pressurization device and tubing/ducting extending therefrom) may be housed entirely within the soaking basin, such as in the bottom base thereof. In the illustrated embodiment, the air discharge apparatus comprises an air pump; in other embodiments, the air discharge apparatus may comprise a suitable air blower. The air discharge apparatus draws ambient air from outside the soaking basin 2 and supplies the pressurized air formed by the air discharge apparatus at a supply location S which is at or adjacent the inside face of the soaking basin. Note that it is the inside face of the soaking basin which receives the liner 10. Furthermore, in the illustrated embodiment, the supply location S is located on the inside face just below a top rim 4A of the basin wall 4. At this particular location, a supply end of the air discharge apparatus supports an air discharge apparatus coupler, to which the liner is connectable, in a position which is presented above a typical waterline of the soaking solution that is indicated at W.

Additionally, the soaking basin includes a heating element 8 (schematically shown) disposed in the bottom base 3 so as to be housed therein. The heating element 8 is standalone from the air discharge apparatus and generates heat for heating the soaking solution contained by the liner 10.

Turning now to the liner, the liner 10 comprises a first body of plastic material 16 which is flexible. This first body of flexible plastic 16 forms an outer layer of the liner. The first body of plastic has an outer face 16A for resting at or adjacent the inside face of the soaking basin 2. That is, the outer face 16A of the first plastic body may be rested at the inside face of the soaking basin and thus in engagement therewith. The first body of plastic may also be rested in the soaking basin but with the body's outer face 16A adjacent the inside face of the soaking basin so as to be in spaced relation relative thereto (such that, for example, an additional element may be disposed intermediate the inside face of the soaking basin and the first body of plastic). Furthermore, the first body of plastic has an inner face 16B opposite to its outer face 16A.

The liner includes a second body of plastic material 18, which is also flexible, joined to the inner face 16B of the first body of plastic. Thus, the second body of flexible plastic forms an inner layer of the liner, with the inner face 16B of the first outer plastic layer forming an interface I between the outer and inner layers. The second body of plastic lines an inside volume of the receptacle formed by the liner 10.

As noted earlier, the first and second bodies of plastic 16, 18 are shaped to form the generally basin-shaped receptacle for holding the soaking solution in the inside volume of the liner. The liner may be pre-shaped so as to more readily conform to a shape of the soaking basin 2 provided by the bottom base 3 and the peripheral basin wall 4. Also, 'basin-shaped' refers to a structure having a bottom and an upstanding wall extending upwardly from the bottom about its periphery so as to form a container. The periphery may be circular or rectangular in shape, for example, and is thus not intended to be limited in its specific shape.

It will be appreciated that the liner 10, as a whole, may be significantly flexible so as to be like a garbage bag, where the liner conforms to a shape of the soaking basin when the liner is nested therein. Alternatively, the liner 10 may be of a hard shell variety such that the liner takes on the shape of the soaking basin free of any structural support provided by the soaking basin.

In the illustrated embodiment, the first and second bodies of plastic are joined at the interface I by heat sealing the two bodies 16, 18 together to one another. As such, both the first and second bodies comprise suitable thermoplastic material, which is also sufficiently resistant to heat so as to not melt when the heating element 8 is operated for heating the soaking solution. Through heat sealing, the two bodies of plastic are permanently coupled to one another at predetermined areas of the interface I. Also, certain prescribed areas between the first and second bodies of plastic 16, 18 are left untreated by the heat sealing process so that the two bodies of plastic are not welded together at these prescribed areas and are thus free to separate from direct engagement with one another thereat.

Thus, an air conduit 20 is formed between the first and second bodies of plastic at these prescribed areas where the two bodies of plastic are not affixed to one another. In the illustrated embodiment, the air conduit 20 extends from a starting end 21 located at a top free end 14A of the receptacle wall, and across the receptacle wall 14 to the base floor 12. That is, the air conduit's starting end 21 is spaced just below a common free end of the first and second bodies of plastic so that a sealed interface is located between the common free end of the bodies to a side of the starting end 21 of the air conduit. As such, the air conduit 20 spans a full height of the receptacle wall 14 and across a majority of a transverse width of the base floor 12. The air conduit 20 is suited for guiding the pressurized air supplied by the air discharge apparatus 6 to the base floor of the liner. Accordingly, the air conduit has a coupling arrangement 22 at the respective starting end 21 of the air conduit for connecting to the air discharge apparatus, which will be described in greater detail later.

Turning to the air conduit in more detail, the air conduit 20 comprises a plurality of supply branches—more specifically, a pair of supply branches 23A and 23B in the illustrated arrangements—which converge with a discharge portion of the air conduit at its terminal end that is located at the base floor 12 of the liner for discharging the air into the liner's inside volume as it will become apparent shortly.

In the first arrangement as more clearly shown in FIG. 1A, the discharge portion of the air conduit forms a centralized closed loop 24 at the base floor. The closed loop is rectangular in shape in the illustrated arrangement; however, in alternative embodiments, the closed loop may comprise any polygonal shape, for example a circle, a hexagon, or a polygon with sides of non-uniform length so as to be generally annular. Furthermore, in alternative embodiments the closed loop may be shaped so as to form an outline of a logo or an aesthetically pleasing pattern. The supply braches 23A, 23B converge with the closed loop at spaced locations separately of one another, and at a common side of the closed loop 24. Thus, the closed loop 24 comprises an intermediate portion 24A between junctions of the respective supply branch with the closed loop, and an outer ring portion 24B which is longer in length than the intermediate portion of the closed loop.

Figure 1B:
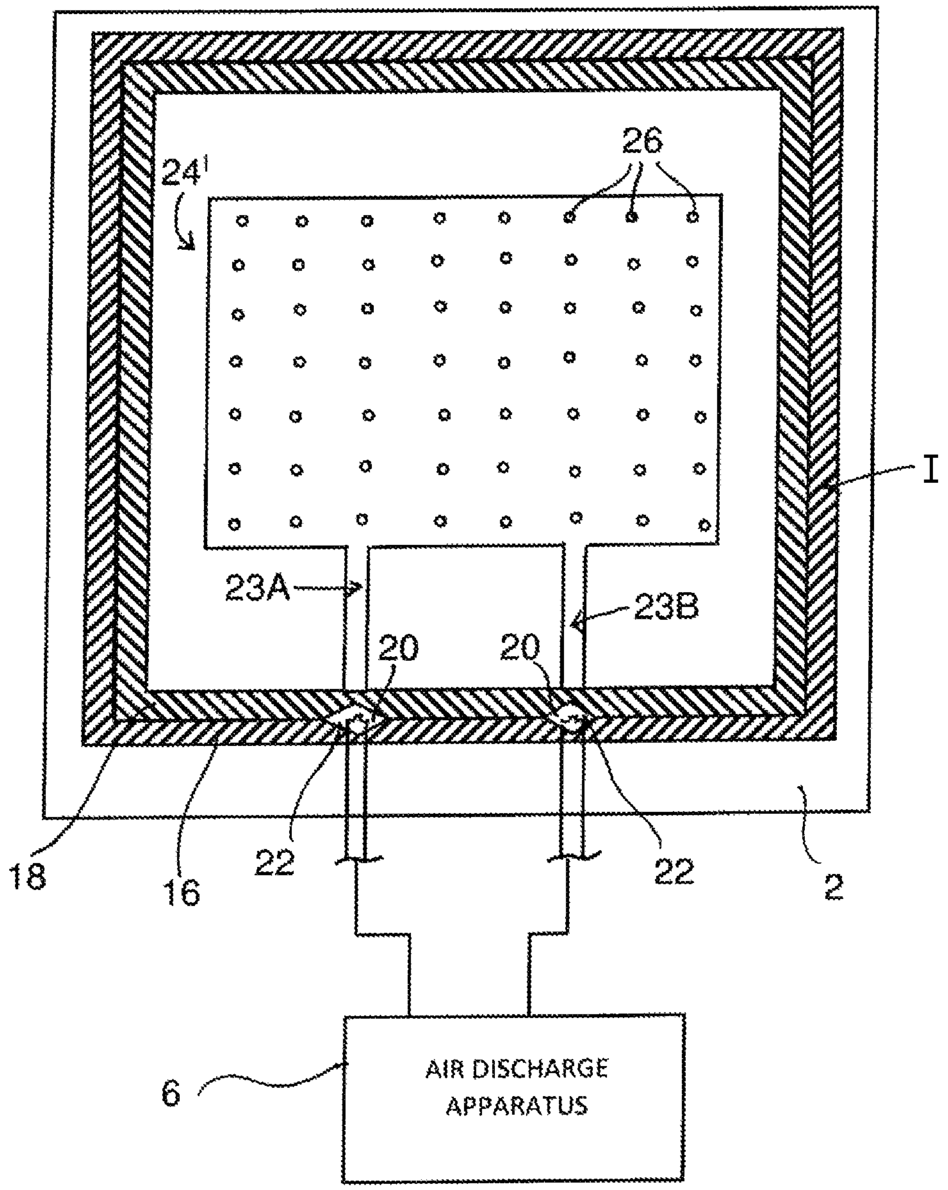
FIG. 1B is a top plan view like that shown in FIG. 1A but of a second arrangement of foot spa and liner.

In another arrangement as shown in FIG. 1B, the discharge portion forms a single centralized chamber 24' fed by two supply branches 23A, 23B which meet the chamber at spaced locations at its perimeter. As such, the air conduit enlarges in cross-section from the relatively narrow supply branches 23A or 23B into the much wider chamber 24' at the air conduit's terminal end. That is, the chamber has a larger wall-to-wall width than either one of the supply branches as measured diametrically across same in transverse cross-section. In the illustrated arrangement, the chamber 24' is localized to the base floor 12 of the liner but covers a relatively large area thereof. Note that in other arrangements having the single chamber 24', the air discharge apparatus may comprise a plurality of individual units such as a plurality of suitable air pumps to provide sufficient pressure through the air conduit.

Figure 2A:
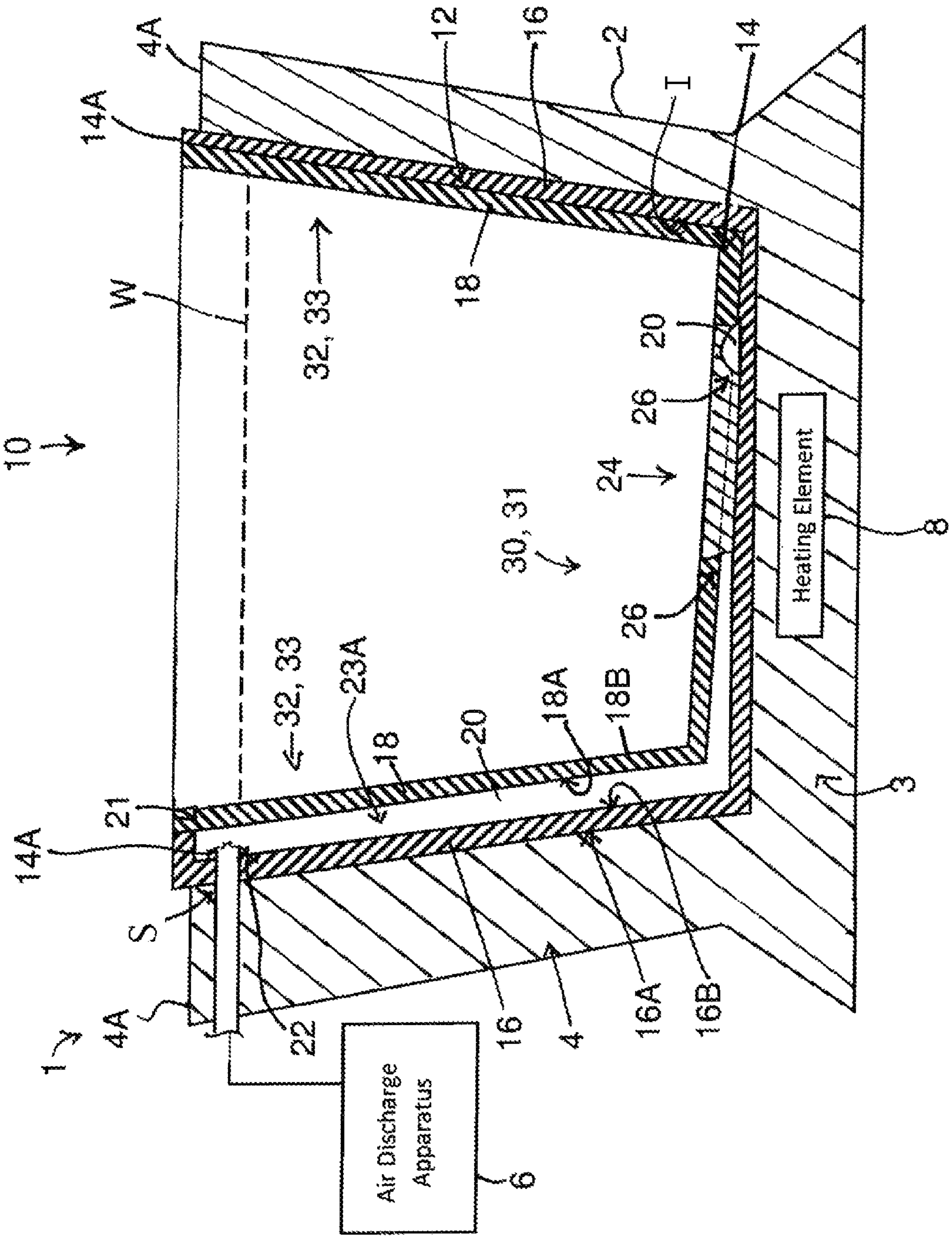
FIG. 2A is a cross-sectional view along line 2-2 in FIG. 1A of the first arrangement.

In order to complete the transfer of the pressurized air from the air discharge apparatus 6 and through the air conduit 20 into the inside volume of the liner such as to provide a fluid massage of the user's feet inserted in the soaking solution, a plurality of openings 26 are provided, being located in the second body of plastic 18. In the illustrated embodiment, the openings 26 are aligned with the air conduit 20 so as to be disposed at spaced positions along the air conduit's length. More specifically, the openings 26 are spaced along the closed loop 24 of the air conduit and spaced across the plan area of the chamber 24' in two dimensions. The two example arrangements of the discharge portion of the air conduit may provide different bubble patterns for the fluid massage of the foot spa. As schematically shown in FIGS. 2A, 2B and 3, these openings are formed across a full thickness of the second body of plastic 18, such that the second body of plastic can be considered to be perforated.

With the openings 26 in the second body of plastic 18, the first body of plastic 16 is imperforate from a location on the first plastic body at which the starting end 21 of the air conduit is disposed to the free end of the first plastic body that defines the top free end 14A of the peripheral liner wall. That is, with the exception of an aperture 27 in the first plastic body for passing the air discharge apparatus coupler therethrough for connecting to the air conduit 20, which is located at the top free end 14A of the liner wall above the typical waterline W of the soaking solution, the first body of plastic is imperforate across a remaining surface area thereof (both the outer and inner faces 16A, 16B thereof) so as to completely isolate the soaking solution containable by the liner from the soaking basin 2. In other words, the first body of plastic is imperforate in all directions across its surface from the aperture 27 in the first plastic body to the peripheral top free end of the liner wall. Note that the aperture 27 defines a predetermined starting location on the first body of plastic generally locating the starting end of the air conduit.

Further to the lack of openings or apertures in the first body of plastic, the coupling arrangement 22 provides an air-tight seal at a point of connection between the air conduit 20 and the air discharge apparatus 6. As shown in FIG. 2A, the coupling arrangement comprises a sealing gasket 22 such as an O-ring that is embedded in the first body of plastic 16 so as to be carried at the inner face 16B of the first plastic body by the first plastic body. The air discharge apparatus coupler, which carries a nozzle on its end in the illustrated embodiment, may fit snugly through the sealing gasket 20 and deliver the pressurized air from the air discharge apparatus 6 into the air conduit 20.

Figure 2B:
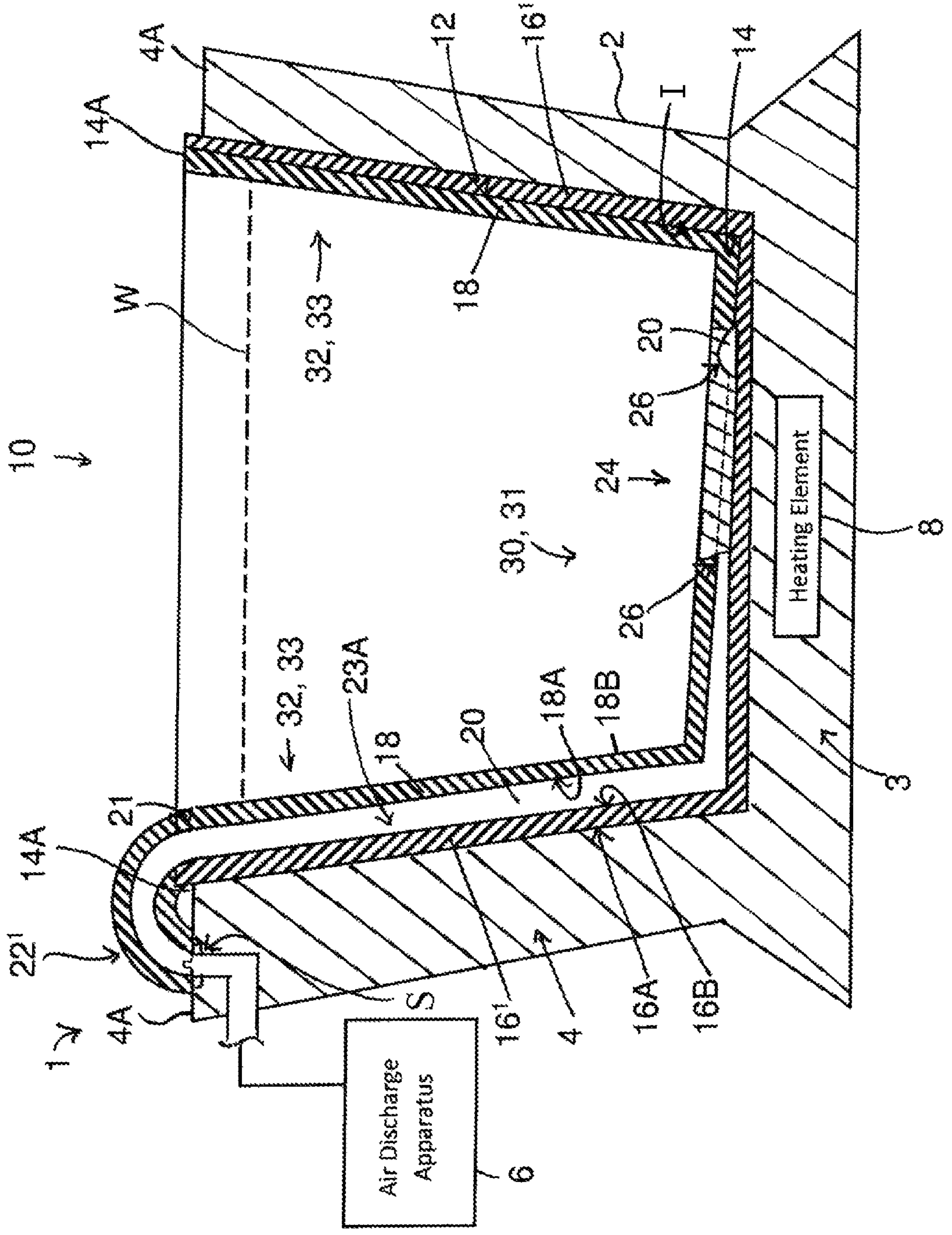
FIG. 2B is a cross-sectional view along line 2-2 like that shown in FIG. 2A but of a third arrangement of foot spa and liner.
Figure 3:
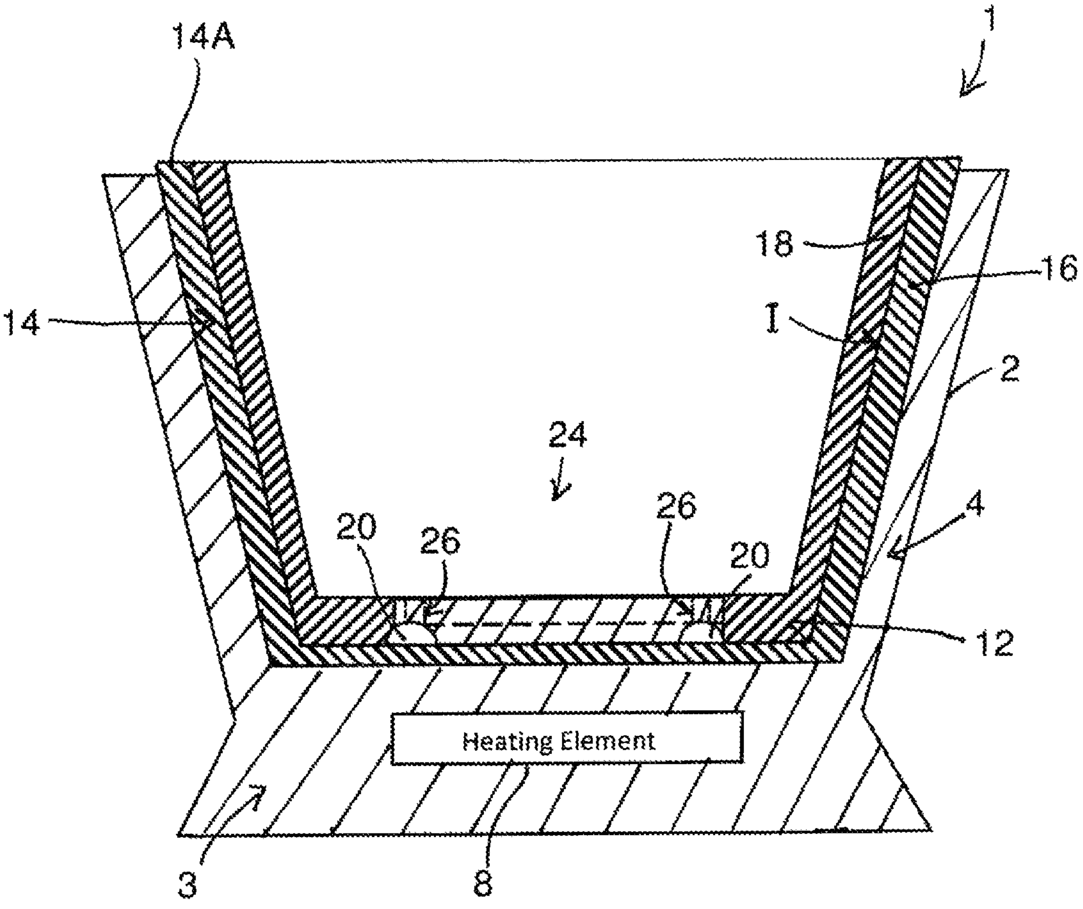
FIG. 3 is a cross-sectional view along line 3-3 in FIG. 1A.

FIG. 2B illustrates another arrangement of liner, and more specifically one in which a different coupling arrangement is employed. That is, in this liner arrangement of FIG. 2B the coupling arrangement comprises a flexible tube 22' which is coupled at the free end 14A of the two bodies of plastic so as to extend the air conduit 20 from the starting end 21 thereof to the supply location S of the air discharge apparatus, which may be presented on the top rim 4A of the peripheral basin wall. A sealing gasket is disposed at or adjacent a free end of the flexible tube 22', which is opposite the starting end 21 of the air conduit. The sealing gasket as illustrated in FIG. 2B is disposed in a closed end wall of the flexible tube. In other arrangements, the sealing gasket may be disposed in a circumferential peripheral wall of the flexible tube 22'. The flexible tube 22', where it is attached to the first and second bodies of plastic 16', 18 may be joined to the plastic bodies such as by heat sealing so that the flexible tube and plastic bodies are effectively unitary. In other arrangements, the flexible tube may comprise an extension of each of the first and second bodies of plastic that is sealed together to form the flexible tube. Also, it will be appreciated that in the arrangement as shown in FIG. 2B, the first body of plastic 16' is imperforate across its entire surface area. In this instance, the predetermined starting location on the first body of plastic for the starting end 21 of the air conduit is located along the free end 14A of the respective plastic body such that the starting location is defined by a portion of the edge of the plastic body.

Since the first and second bodies of plastic are flexible, circumferential or perimeter walls of the air conduit 20 are flexible. That is, a top portion of the walls of the air conduit is defined by an inner face 18A of the second body of flexible plastic, which forms the interface with the inner face 16B of the first body of plastic. Furthermore, a bottom portion of the walls of the air conduit is defined by the inner face 16B of the first body of flexible plastic. As such, a diameter of the air conduit 20, as measured between the inner faces 16B, 18A of the first and second bodies of plastic, is expandable in response to a pressure value of the pressurized air which is passed through the air conduit. That is, when no air is passed through the air conduit, the air conduit may be in a first contracted state with a small, first diameter value. When air from the air discharge apparatus 6 is passed through the air conduit, the air conduit may dilate from the first contracted state to a second dilated/expanded state with a larger, second diameter value. With increasing pressure of the pressurized air from the air discharge apparatus 6, the air conduit may further expand with respect to the second diameter value. As such, diameter of the air conduit 20 may change in size with the particular pressure value of the pressurized air from the air discharge apparatus, between a minimum diameter when no air is passed through the air conduit (as in the contracted state) to a maximum diameter attained at a particular pressure value (after which the air conduit's diameter no longer increases with rising pressure values which are larger than this particular pressure value).

Thus, through use of flexible plastics, sufficient pressure may be maintained along a length of the air conduit 20 so as to resist back pressure of the soaking solution and thus provide sustained transfer of the pressurized air from the air discharge apparatus 6, through the air conduit 20, and into the inside volume of the liner where the soaking solution may be contained.

Although the air conduit's diameter may vary in size depending on the pressure value of the air passed therethrough, the diameter of the air conduit 20 lies in a prescribed size range in order to provide the sustained transfer of the pressurized air throughout operation of the foot spa. The air conduit's diameter may lie in a first prescribed range between 1 and 25 millimetres for proper functionality. The diameter of the air conduit may also lie in a second prescribed range between 1.5 and 23 millimetres and provide similar functionality to the first prescribed range. Additionally, the diameter of the air conduit may lie in a third prescribed range between 2 and 20 millimetres and provide similar functionality to either one of the first and second prescribed ranges.

As alluded to earlier in this specification, the liner according to the present invention is suited for containing the soaking solution within the soaking basin as part of a pedicure treatment, in which the user's feet are soaked in the soaking solution for a prescribed period of time. The liner 10 according to the present invention provides isolation of the soaking solution from the soaking basin 2 and provides means for generating a fluid massage by releasing a stream of bubbles via an air conduit 20 formed in the liner 10.

In use, one such liner 10 according to the present invention is inserted into the soaking basin 2 of the foot spa so as to be installed therein. The first body of plastic 16 rests at or adjacent the inside face of the soaking basin 2, and the second body of plastic 18 is thus segregated from the inside face of the soaking basin by the first plastic body. Additionally, it is noted that the base floor 12 of the liner covers the inside face of the soaking basin at the bottom base 3 thereof and the peripheral liner wall 14 covers the inside face at the peripheral basin wall 4.

The liner is filled with the soaking solution to the typical waterline W, which is below the starting end 21 of the air conduit. The air discharge apparatus 6 is operated so as to deliver the pressurized air to the closed loop 24 through both supply branches 23A and 23B in parallel. Bubbles are discharged from the openings 26 in the closed loop 24 as the air passes from inside the air conduit 20 to the inside volume of the liner 10 where the soaking solution is contained. After use in the pedicure treatment, the liner 10 is removed from the soaking basin 2 and the soaking solution is emptied therefrom so that used liner can be discarded.

We now turn to the method of forming the liner of the illustrated liner arrangements in further detail. Each one of the first and second bodies of plastic 16, 18 have a respective surface area spanning across two opposite large faces of the plastic and a thickness measured therebetween. The large faces, indicated at 16A and 16B for the first plastic body and at 18A and 18B for the second plastic body, are delimited by a peripheral body edge 28. Furthermore, in the illustrated arrangements of FIGS. 4 and 5, each one of the large faces defines the respective one of the inner and outer face of the respective body of plastic 16, 18.

Figure 4:
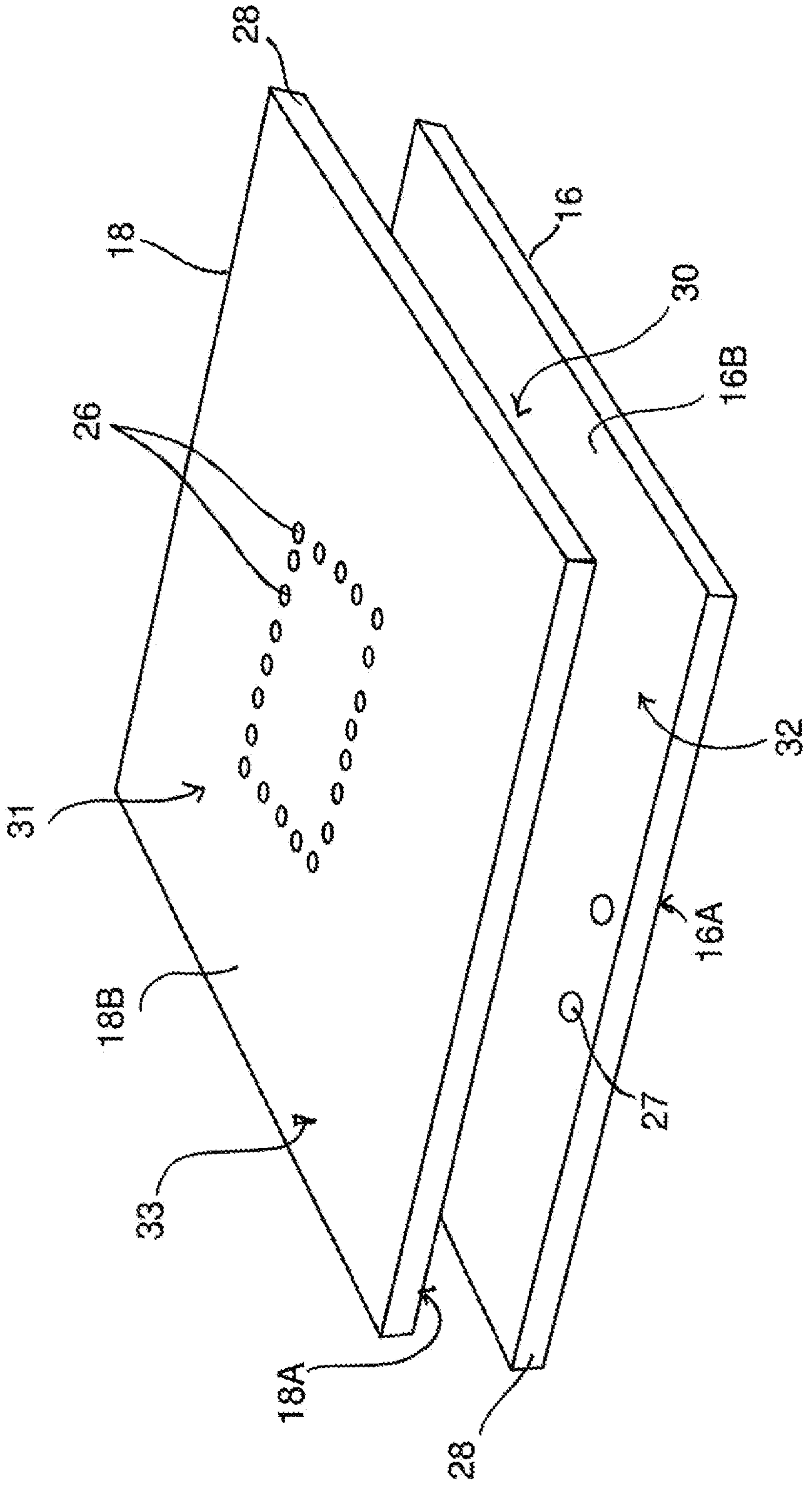
FIG. 4 is a perspective view of first and second bodies of plastic of liner according to the present invention where the bodies of plastic are shown separated from one another.
Figure 5:
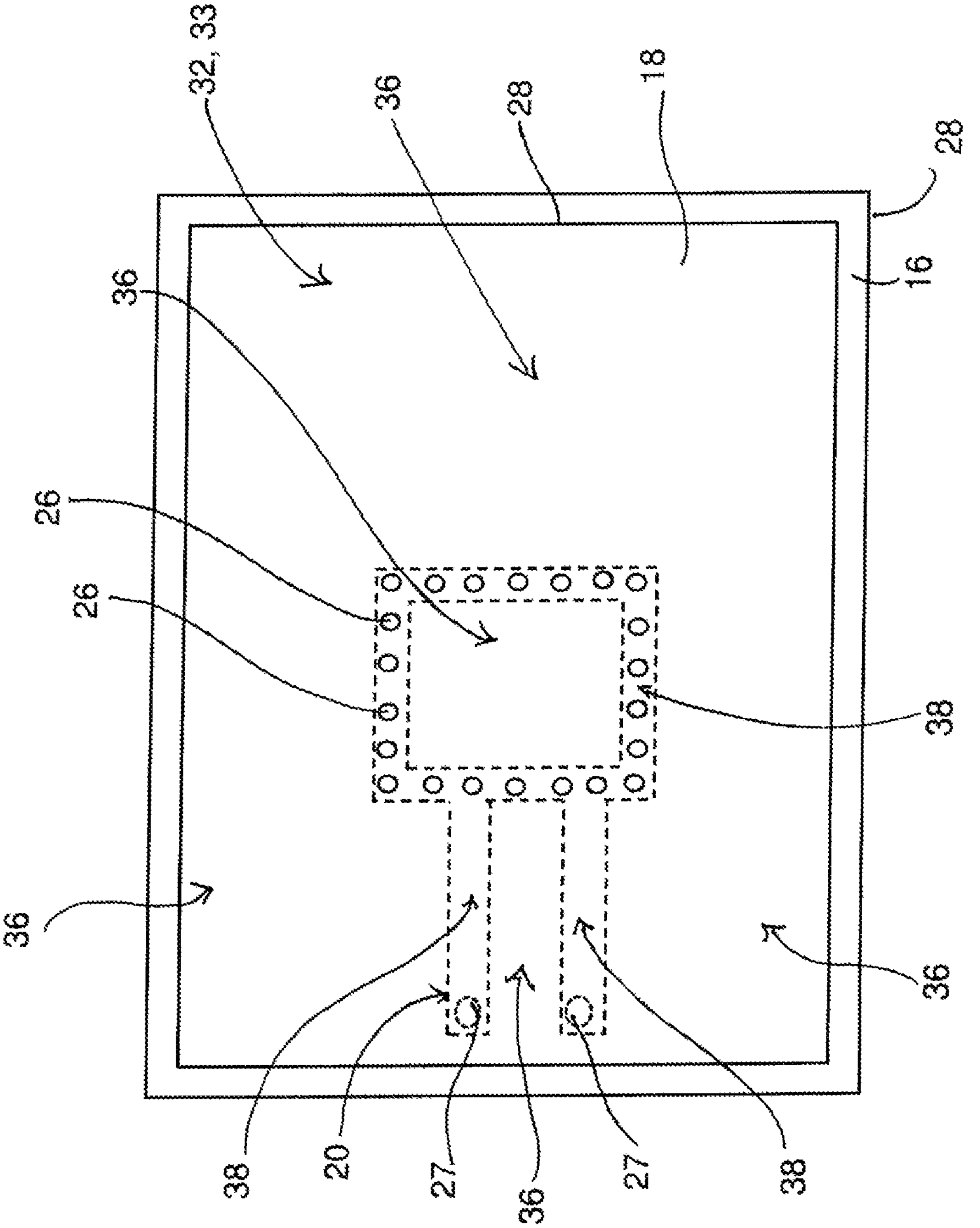
FIG. 5 is a top plan view of the first and second bodies of plastic of FIG. 4 where the bodies of plastic are shown overlaid one on top of the other so as to better illustrate treated and untreated areas of the bodies of plastic when they are joined together.

In the illustrated arrangement of FIGS. 4 and 5, each one of the first and second bodies of plastic 16, 18 also has a central body portion indicated at 30 and 31 respectively, which comprises a centrally located area of the respective body that is surrounded by a fringing body portion indicated at 32 and 33 respectively. The fringing body portion 32, 33 comprises a bordering area of the respective plastic body that encloses the central body portion 30, 31.

Additionally, in the illustrated arrangement of FIGS. 4 and 5, the first and second bodies of plastic are sized and shaped in a manner so as to be substantially uniform in size (i.e., equal in size to one another) and generally matching in shape. That is, the first and second bodies of plastic 16, 18 are identical in shape, and nearly identical in size such that the inner layer of the two (i.e., the second body of plastic 18 of the illustrated embodiment) is slightly smaller than the outer layer (i.e., the first body of plastic 16 of the illustrated embodiment).

Typically, the first and second bodies of plastic 16, 18 are provided ready-to-go, that is with the appropriate openings formed at the appropriate locations on the respective body. That is, the first body of plastic 16 has at least one aperture 27 (more specifically two apertures in the illustrated embodiment) formed across its full thickness and located in its fringing body portion 32. In the illustrated embodiment, the at least one aperture 27 is located at or adjacent a free end of the first plastic body, without intersecting the peripheral body edge 28 so that an amount of plastic is disposed in all directions around the respective aperture. Furthermore, the second body of plastic 18 has the plurality of openings 26 located in its central body portion 31.

When the first and second bodies of plastic are brought together before coupling together, the central body portions 30 and 31 of the two plastic bodies register with one another and the fringing body portions 32 and 33 of the two plastic bodies register with one another. That is, the corresponding one of the central body portion and the fringing body portion of one plastic body is aligned with that of the other plastic body, so that they overlap one another in their aligned configuration as better shown in FIG. 5.

Once in the aligned configuration, the first and second bodies of plastic are welded (in other words, fused) to one another at a first one of their respective faces 16B and 18A. To perform the welding, heat is used to melt the plastic bodies together, and the heat is applied according to a prescribed heating pattern. That is, the heat is applied to pre-specified areas 36 of each body of plastic where the bodies of plastic are intended to be joined together. For example, a heat applicator with suitable heating control, generally in the form of a heat gun, is brought in sufficiently close proximity to the bodies of plastic and is moved over the bodies of plastic according to the prescribed heating pattern; this heat applicator may be carried on a track system supported over a working area where the plastic bodies 16, 18 are placed such that the heat applicator is movable in a plane over the working area and computer controlled in order to apply the heat according the prescribed heating pattern. Untreated areas 38 of each body of plastic are thus free to separate from direct engagement with one another at their first faces 16B, 18A. These untreated areas 38 also register with the at least one opening 27 in the first body of plastic 16 and the plurality of openings 26 in the second of body of plastic 18. Thus, the untreated areas form a path disposed between the first faces 16B, 18A of the two bodies of plastic that spans from the at least one opening 27 in the fringing body portion 32 of the first body of plastic, which is located at or adjacent a common free end of the joined bodies of plastic, to the plurality of openings 26 in the central body portion 31 of the second plastic body. This path forms the air conduit 20 of the liner.

In particular, at the location on the first and second bodies of plastic where the respective aperture 27 in the first body of plastic is disposed, the two bodies of plastic are joined across the surface of their first faces 16B, 18A that is disposed between a periphery of the respective aperture and the peripheral body edge 28 of the plastic bodies so as to close the air conduit 20 in the area between the first faces of the bodies of plastic such that the respective aperture 27 defines the only passageway from outside the joined bodies of plastic into the air conduit 20.

As part of the manufacturing process, the first and second bodies of plastic are also arranged in a manner such that they can be formed into the receptacle having the base floor 12 and the upstanding peripheral liner wall 14. For example, the first and second bodies 16, 18 when joined together may be shaped into the form of the receptacle. The shaping of the first and second bodies may be fixed when the liner is made as the hard shell type, and the shaping may alternatively be pliable when the liner is made to be like a garbage bag. Regardless of the specific type of liner manufactured, the central body portions 30, 31 of the two plastic bodies form the base floor 12 and the fringing body portions 32, 33 form the peripheral liner wall 14. That is, the central body portions are located at the base floor, and the fringing body portions are located at the liner wall. Thus, the central body portions of the plastic bodies may extend up across a portion of the peripheral liner wall so as to occupy some area of the liner wall in some embodiments, and alternatively the fringing body portions may extend down across a portion of the base floor so as to occupy some area of the base floor in some other embodiments. Furthermore, with the at least one aperture 27 in the first body of plastic located at or adjacent its free end that defines the top free end 14A of the liner wall, the at least one opening is therefore located near a top of the soaking basin 2 as better shown in FIG. 2 so as to be at or above the typical waterline W of the soaking solution. According to this arrangement, the untreated areas 38 extend from a location at or adjacent the top free end 14A of the peripheral liner wall 14 that is defined by the common free end of the joined plastic bodies, and across the peripheral liner wall to the base floor where the untreated areas form the closed loop 24 thereat.

Additionally, for the appropriate arrangement, a sealing gasket 22 is embedded in the first body of plastic 16 such that the sealing gasket is carried at the first face 16B thereof. The sealing gasket provides an air-tight seal for the air discharge apparatus coupler when same is communicated with the air conduit 20.

In the other arrangement of the liner as shown in FIG. 2B, the flexible tube 22' is held in abutting engagement with the free end 14A of the two plastic bodies 16, 18 and thus welded using heat to the free end 14A in the abutting engagement therewith.

Figure 6:
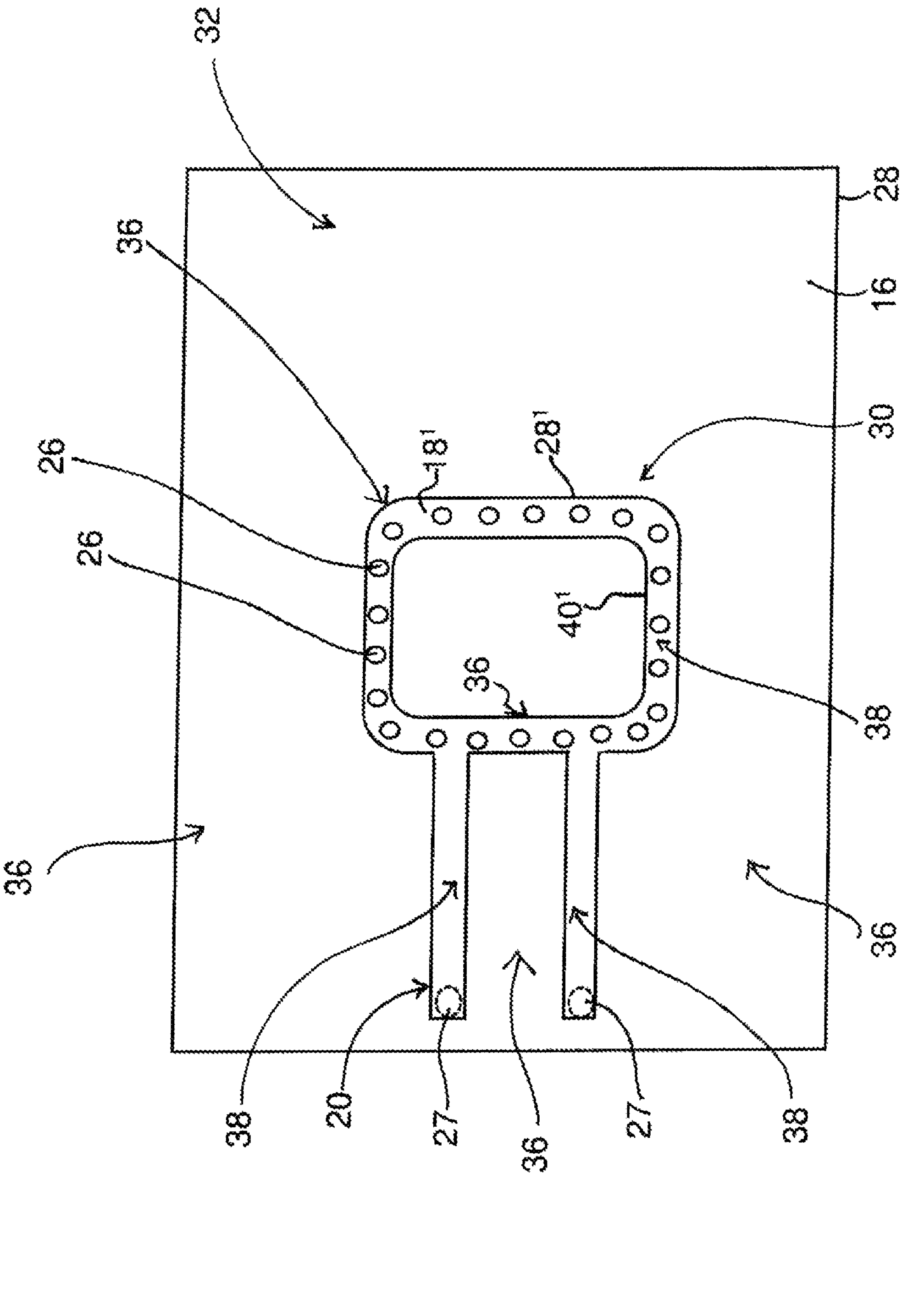
FIG. 6 is a top plan view like that in FIG. 5 but of another arrangement of first and second bodies of plastic where the bodies of plastic are sized substantially differently in size.

FIG. 6 shows an alternate arrangement in which the second body of plastic 18', which locates the openings 26, is shaped to have an outer periphery 28' which generally follows a path of the air conduit 20. In this alternate arrangement, the second of plastic 18' includes an inner periphery 40' which follows an inner perimeter of the air conduit at the closed loop 24. Thus, the second body of plastic 18' is sized in its surface area so as to cover the air conduit 20 with minimal overlap with the first face of the first body of plastic 16. Thus, the interface I between the first and second bodies of plastic that defines the pre-specified areas to which heat is to be applied is limited to that along the outer and inner peripheries 28', 40' of the second body of plastic at the second body's first face 18A. The minimal overlap is enough to form a suitable weld connection between the two bodies of plastic so that the air conduit is sealed along the outer and inner peripheries of the second plastic body. As such, a remaining surface area of the first plastic body's first face 16B including portions of the central body portion 30 thereof and the fringing body portion 32 thereof is left uncovered by the second body of plastic so as to be exposable to the soaking solution. It will be appreciated that the air conduit 20 traverses an area across the surface area of the first body of plastic 16 which is typically much smaller than same. That is, an overall area over which the air conduit spans, even if that delimited by the closed loop 24 is included within the overall area, is smaller than the surface area of the first plastic body such that there a portion of the first plastic body's surface area remains uncovered by the second plastic body 18'.

Note that in alternative embodiments, the liner may include more than two bodies of plastic forming more than two layers of the liner. For example, an additional body of plastic may be joined to the outer face 16A of the first plastic body of the illustrated embodiment so as to form an outer layer in relation thereto. This additional body of plastic may be imperforate in a similar manner as the first body of plastic of the illustrated arrangements. That is, with the exception of an aperture in the additional body of plastic for passing the air discharge apparatus coupler therethrough, the additional body of plastic is imperforate from a location thereon at which the starting end of the air conduit is disposed to the free end of the additional plastic body that defines the top free end 14A of the peripheral liner wall. In another example, an auxiliary plastic body may be provided so as to be joined to the outer face 18B of the second body of plastic of the illustrated embodiment that is opposite the second plastic body's inner face 18A. The auxiliary plastic body has openings formed across its full thickness and aligned with the openings 26 of the second plastic body of the illustrated embodiment so that the pressurized air passes from the air conduit 20, through the openings 26 in the second body and through the openings in the auxiliary plastic body to the inside volume of the liner receptacle.

Figure 7:
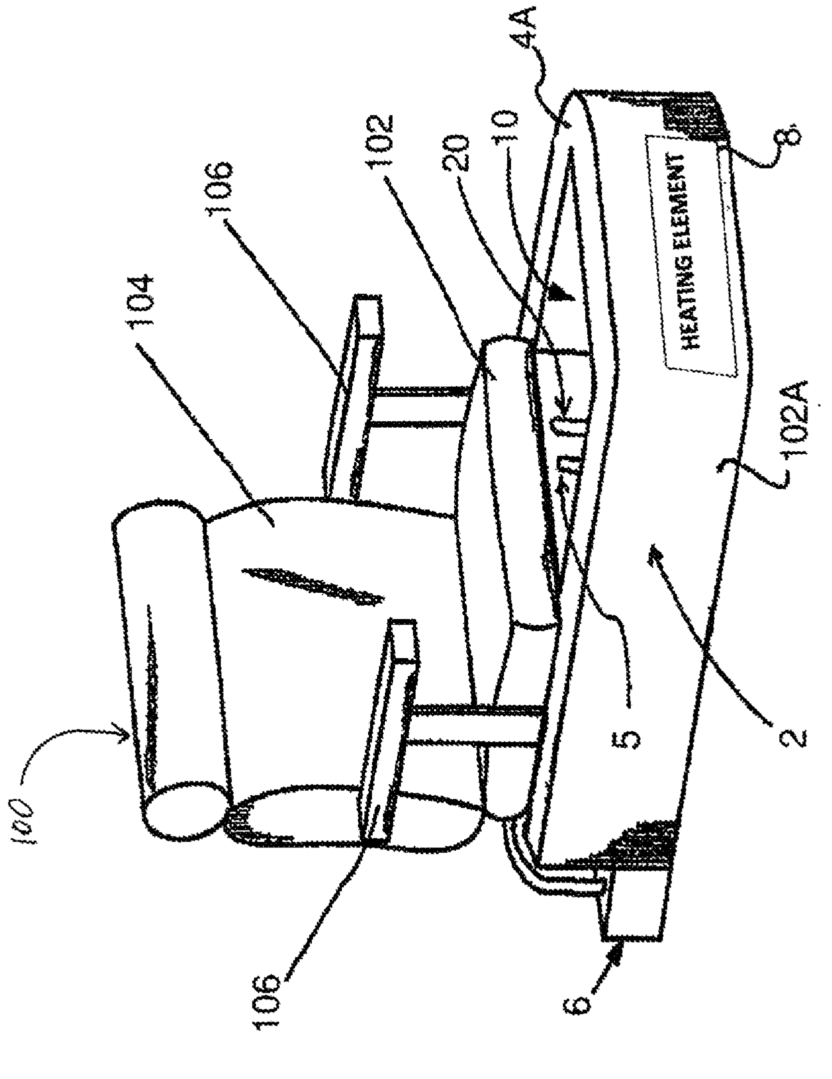
FIG. 7 is a perspective view of a spa chair comprising a foot spa and liner according to the present invention.

Furthermore, it will be appreciated that the soaking basin 2 is typically used in combination with a seat 100 receiving a patient of the pedicure treatment in seating position thereon with the feet of the patient presented forwardly of the seat. The soaking basin 2 is located in front of the seat 100 such that the feet of the patient are received therein. The soaking basin and seat may be integrated together in the form of a spa chair 102, like that illustrated in FIG. 7, which includes a backrest 104 and arm rests 106. FIG. 7 shows the air discharge apparatus 6 disposed externally of an enclosure 102A of the spa chair and suitable tubing stemming from the air discharge apparatus to deliver the air to the supply location S. However, in other arrangements the air discharge apparatus may be contained within the enclosure 102A.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A liner comprising:

a first body of flexible plastic having an inner face and an opposing outer face;

a second body of flexible plastic joined to the first body of flexible plastic, the second body of flexible plastic forming an air conduit between the first body of flexible plastic and the second body of flexible plastic such that a circumferential wall of the air conduit is defined in part by the first body of flexible plastic and in part by the second body of flexible plastic;

the first body of flexible plastic and second body of flexible plastic together forming a receptacle having a base and a wall extending from the base configured to be placed in a basin for containing a liquid thereby delimiting an interior volume of the receptacle for containing liquid in the basin and isolating the liquid from the basin; and a plurality of openings through the circumferential wall of the air conduit which provide a fluid pathway from the air conduit to the interior volume of the receptacle.

2. The liner of claim 1, further comprising:

a flexible tube having a first end and a free end, the first end attached to at least one of the first body of flexible plastic and the second body of flexible plastic such that the first end is in fluid communication with the air conduit, and the free end for coupling to a source of pressurized air.

3. The liner of claim 2, wherein the free end of the flexible tube is not attached to either the first body of flexible plastic or the second body of flexible plastic.

4. The liner of claim 2, wherein the first end of the flexible tube is attached to said at least one of the first body of flexible plastic and the second body of flexible plastic by heat-welding.

5. The liner of claim 1, wherein the second body of flexible plastic has a surface area which is sized so as to form the air conduit with minimal overlap with the inner face of the first body of flexible plastic.

6. The liner of claim 5, wherein the second body of flexible plastic is joined to the inner face of the first body of flexible plastic.

7. The liner of claim 6, wherein the second body of flexible plastic is shaped to have an outer periphery which follows a path of the air conduit, and the second body of flexible plastic is joined to the inner face of the first body of flexible plastic along the outer periphery of the second body of flexible plastic.

8. The liner of claim 1, wherein the second body of flexible plastic is joined to the first body of flexible plastic by welding.

9. The liner of claim 1, wherein the second body of flexible plastic is joined to the first body of flexible plastic by heat-welding.

10. The liner of claim 1, wherein the first body of flexible plastic is imperforate.

11. The liner of claim 1, wherein the air conduit forms a closed loop path.

12. A disposable liner for containing a soaking solution in a soaking basin of a foot spa, the liner comprising:

a first body of flexible plastic having an inner face and an opposing outer face;

a second body of flexible plastic joined to the first body of flexible plastic, the second body of flexible plastic forming an air conduit between the first body of flexible plastic and the second body of flexible plastic such that a circumferential wall of the air conduit is defined in part by the first body of flexible plastic and in part by the second body of flexible plastic;

the first body of flexible plastic and second body of flexible plastic together forming a receptacle having a base and a wall extending from the base configured to be placed in a soaking basin for containing a soaking solution thereby delimiting an interior volume of the receptacle for containing the soaking solution in the soaking basin and isolating the soaking solution from the soaking basin; and a plurality of openings through the circumferential wall of the air conduit which provide a fluid pathway from the air conduit to the interior volume of the receptacle.

13. The disposable liner of claim 12, further comprising:

a flexible tube having a first end and a free end, the first end attached to at least one of the first body of flexible plastic and the second body of flexible plastic such that the first end is in fluid communication with the air conduit, and the free end for coupling to a source of pressurized air.

14. The disposable liner of claim 13, wherein the free end of the flexible tube is not attached to either the first body of flexible plastic or the second body of flexible plastic.

15. The disposable liner of claim 13, wherein the first end of the flexible tube is attached to said at least one of the first body of flexible plastic and the second body of flexible plastic by heat-welding.

16. The disposable liner of claim 12, wherein the second body of flexible plastic has a surface area which is sized so as to form the air conduit with minimal overlap with the inner face of the first body of flexible plastic.

17. The disposable liner of claim 12, wherein the second body of flexible plastic is joined to the inner face of the first body of flexible plastic.

18. The disposable liner of claim 17, wherein the second body of flexible plastic is shaped to have an outer periphery which follows a path of the air conduit, and the second body of flexible plastic is joined to the inner face of the first body of flexible plastic along the outer periphery of the second body of flexible plastic.

19. The disposable liner of claim 12, wherein the second body of flexible plastic is joined to the first body of flexible plastic by welding.

20. The disposable liner of claim 12, wherein the second body of flexible plastic is joined to the first body of flexible plastic by heat-welding.

* * * * *